July 1, 1958 — H. ELLENBERGER — 2,841,047
INSTRUMENT LEVELING MEANS
Filed May 6, 1957 — 4 Sheets-Sheet 1

Inventor:
Heinrich Ellenberger
By [signature]
Patent Agent

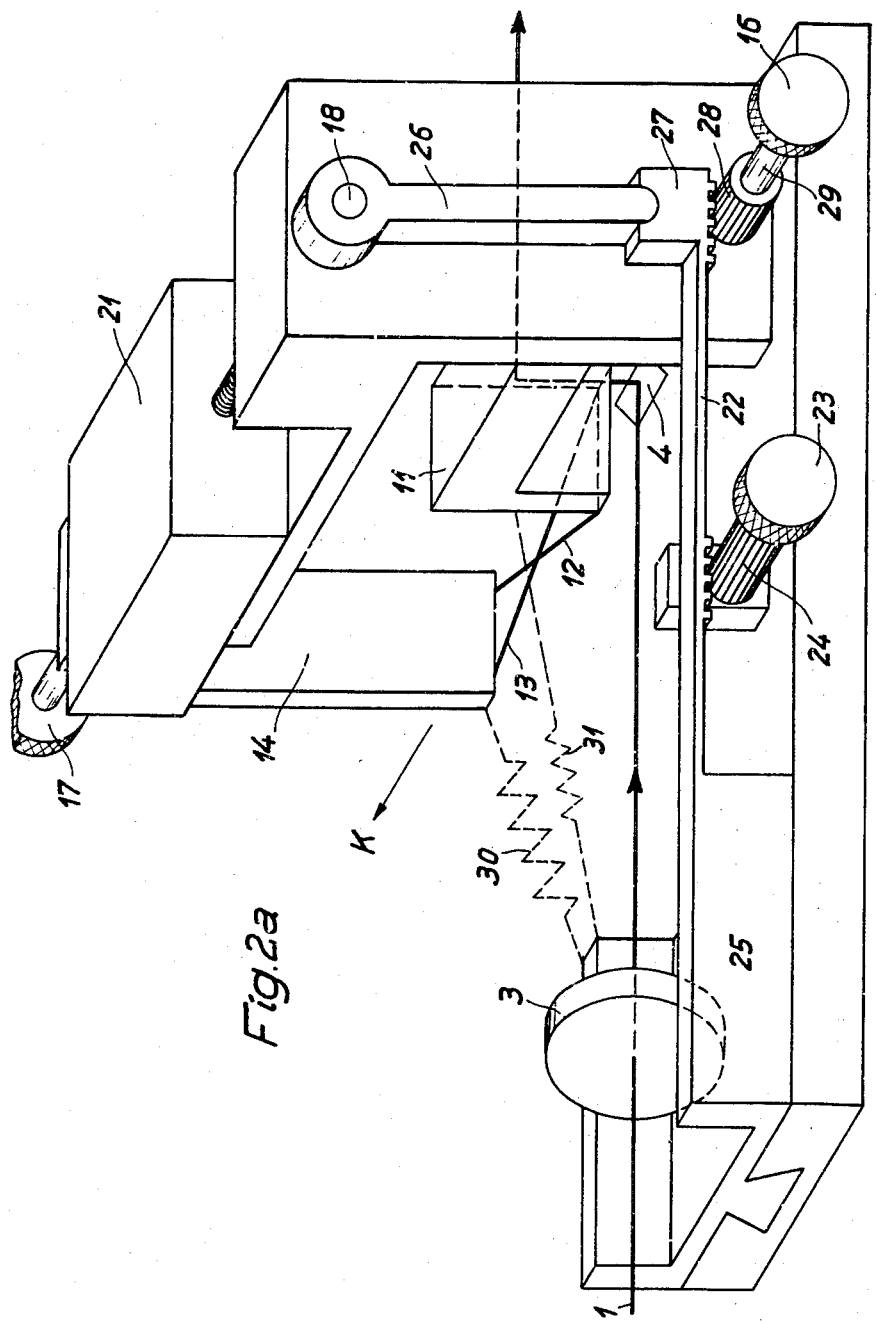

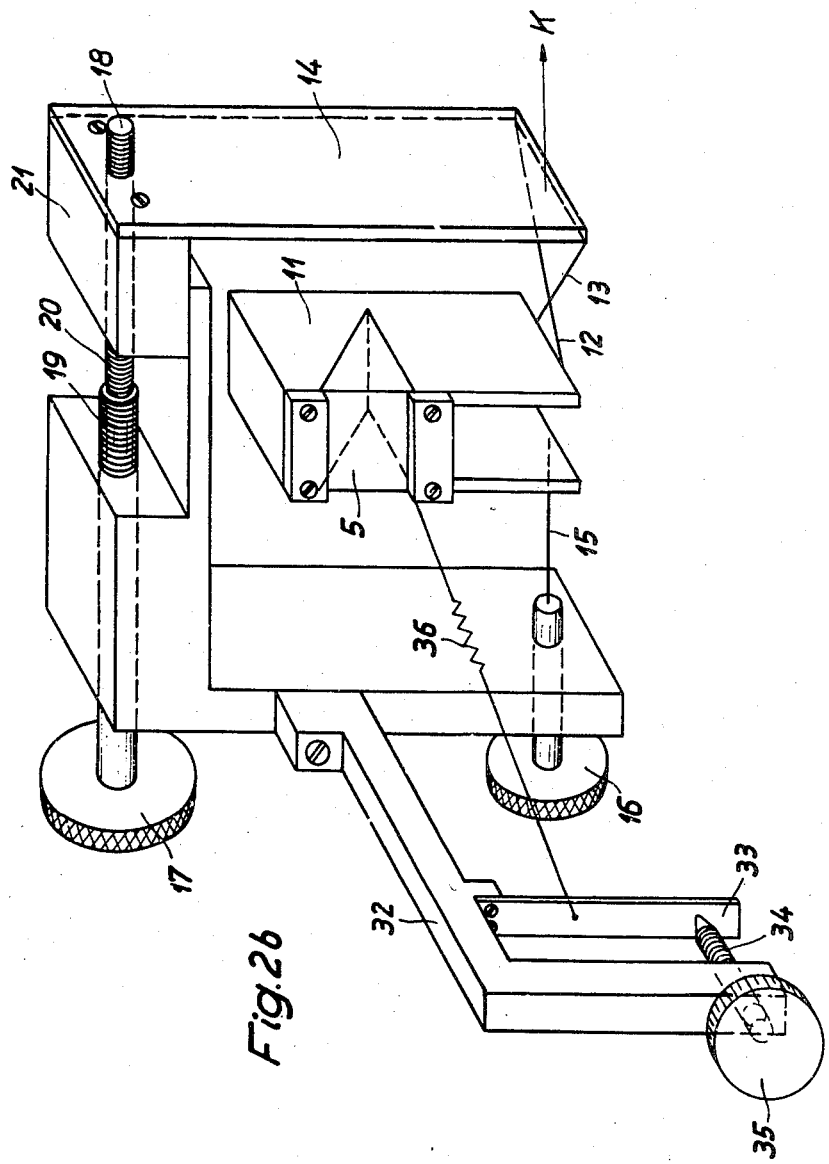

July 1, 1958  H. ELLENBERGER  2,841,047
INSTRUMENT LEVELING MEANS
Filed May 6, 1957  4 Sheets-Sheet 4

Inventor:
Heinrich Ellenberger
By
Patent Agent

2,841,047

INSTRUMENT LEVELING MEANS

Heinrich Ellenberger, Munich-Pasing, Germany

Application May 6, 1957, Serial No. 657,181

Claims priority, application Germany May 7, 1956

11 Claims. (Cl. 88—2.4)

The present invention relates to automatic, self-adjusting leveling instruments.

In the use of leveling instruments, the latter have to be adjusted in such a manner that the sighting plane of the observation telescope is perpendicular with respect to the vertical. This is obtained by coarse adjustment by means of a circular spirit level and by subsequent fine adjustment by means of a sighting level. In instruments having automatic leveling, the fine adjustment is automatically effected by means of an optical member provided in the instrument, thus eliminating the step of adjusting the sighting level.

The observer determines the difference in level of two points during the leveling adjustment, i. e., he reads the linear graduation on two surveyor's rods which are held vertically. The difference between the two linear readings is the difference in level between the two points at which the surveyor's rods were held vertically. The accuracy of measurement is dependent upon the accuracy of reading of the linear graduations on the surveyor's rods. In case of many leveling tests, it is sufficient for the observer to estimate the position of the horizontal cross hair between graduations on the surveyor's rod. The observer will be able to estimate, for example, ±1/10 of a graduation on the surveyor's rod. In case of fine leveling, an optical micrometer is used for reading of the surveyor's rod. Such optical micrometer comprises a rotatable plate with parallel faces in front of the objective. When the instrument is level, the image of a line on the surveyor's rod can be made to coincide with a horizontal line on the graduated dial by rotation of the plate. The angular displacement of the plate having parallel faces is a measure of the location of the line of the graduated dial between the images of two graduations on the surveyor's rod and can be read by the observer. For physiological reasons, this coincidence method results in more accurate readings than the interval estimating method.

Various constructions of automatic leveling devices have been known. The optical member may, for example, constitute a prism inserted in the path of the beam of the telescope, this prism being movably suspended from the instrument body by means of filaments attached to the four corners of its base, in such a manner, that during tilting of the leveling instrument, the sighting plane remains horizontal due to the relative displacement and rotation of the prism. Alternatively, the prism may be supported on a shaft suspended in two V-shaped strips or mounted in a pendulum and lever system. The prism may also be supported by an elastic intermediate member or a tensioned filament or band. Finally, a movably suspended graduated dial may be provided in the telescope. All of these constructions may be designed in such a manner, that the sighting plane of the leveling instrument is independent of the inclination of the telescope within a certain angular range. Such instruments have the disadvantage that they have to be set or adjusted in the factory and the operator is unable to make subsequent adjustments during use. As a result of this, the applications of these instruments are considerably limited, because they do not assure accurate readings at all times. This is particularly undesirable when the instruments are used in territories remote from the factory, where they are subjected to great mechanical stress due to conditions of transportation. Shocks and vibrations during shipping and mounting of the instrument may permanently change the suspension of the optical member. It also happens that in factory-new instruments, the setting is changed without outer influences due to subsequent ageing of the material. Thus, the leveling and the positioning of the target images with respect to the cross hairs may be changed. The position of the target image can be corrected by the observer to a limited extent by displacing the graduated dial, but the leveling condition can be corrected only by sending the instrument to an expert who has the special equipment and know-how required to adjust or set the instrument or to replace a damaged part. Such delays are time consuming and expensive and increase the difficulty of completing surveying jobs.

A further disadvantage of the known instrument results from the fact that automatic leveling is dependent upon the position of the optical member and upon its distance from the target. Automatic leveling is independent of the distance setting of the leveling instrument only when the optical member is located in the so-called anallatic point. In self-leveling instruments, the optical control member and its suspension are built as a composite unit. All parts of such a structural unit cannot be placed at the anallatic point, except by use of a complex and expensive optical system. Such expense cannot be absorbed in case of simple leveling instruments, such as engineering and surveying instruments.

In general, optical apparatus with a focusing lens has been used. In such instruments, the location of the anallatic point is dependent upon the position of the focusing lens. Tests with such leveling instruments give contradictory results which depend upon the distances of the targets. Furthermore, the adjusting mechanism is inaccessible to the operator.

It is an object of the present invention to provide a rotary oscillating suspension for leveling instruments having a telescope and self-adjusting means. Such a rotary oscillating suspension comprises a rotatable body, one end of which is held by a torsion wire located on the axis of rotation and supporting the body so that it cannot be displaced in an axial direction. A resiliently supported, bifilar or multi-filament tensioning means is applied to the other end of this rotatable body, said tensioning means being twisted from a zero position. According to the present invention, the rotatable body serves as a controlling optical part, wherein the torsion wire is intended to change the target direction and the adjusting means is intended to provide a tensioning force for adjusting the self-leveling.

By this structure, the center of the target direction can be corrected within wide limits and, in the same way, the self-leveling feature can be compensated for different target distances and can be corrected in its setting. The rotatable swinging suspension assures a shock-proof mounting of the control member and measurements without disturbances, even in case of intensive jolts.

Under field conditions, the operator during measuring can test the self-leveling condition of the instrument according to the invention and correct this condition, for example, by observing a fixed target on the landscape or a graduation on a surveyor's rod and by tilting the leveling instrument within the range of the circular spirit level by adjusting one or the foot screws of the leveling instrument. If the position of the target image varies with respect to the cross hairs, the observer has only to operate the adjustment of the tension force in order to re-center the target image. If the target image becomes fixed during tilting through stable small inclinations of the leveling instrument, this is an assurance that the self-leveling feature is operating. In case of improper handling of the instrument, for example, when the instrument is dropped during changing of measuring locations, the instrument can be tested at the new location and corrected, so that the series of measurements can be completed.

With the instruments heretofore used, it often happened that a measuring series had to be interrupted or remade, while with the instrument according to the invention, the tests can be continued in such cases without loss of time and accuracy.

Furthermore, with the instrument according to the invention, the target direction can be adjusted with respect to the horizontal, for example, by first placing the instrument at a point between two surveyor's rods and reading therefrom the proper level difference $h$ of the two surveyor's rods. These surveyor's rods are left standing and the instrument is set to the shortest target distance to which it can be adjusted and is brought in front of the surveyor's rod which is at the higher level, whereupon the height I of the instrument is read. The instrument is then turned towards the remotely located surveyor's rod and the adjusting means for the torsion wire is adjusted until the height $h+I$ can be read. At this position, the target direction is horizontal.

In addition, with the instrument according to the invention, the adjusting means for the torsion wire can be used for coincidence reading and as a micrometer, so that the plate having plane faces can be omitted in front of the eyepiece. During the reading of the graduation on the surveyor's rod, the operator can vary the adjusting means for the torsion wire until the aligns, for example, a line on the graduation of this surveyor's rod with the horizontal line of the graduated dial. The displacement of the torsion wire adjusting means is a measure of the position of the horizontal line of the graduated dial between two graduations on the surveyor's rod. The adjustment device for the torsion wire can be used as a micrometer if it has a graduated plate which is held by friction and can be displaced with respect to the adjustment device. When the target direction is to be corrected, the operator will first adjust the target direction with respect to the horizontal and will then turn the micrometer graduation to the zero mark. The instrument according to the invention can be used as a fine-leveling apparatus and will fulfill the highest requirements.

The new instrument can be made of inexpensive materials and can be used in factory-new condition without artificial ageing or previous storing, because the operator can test the adjustment and can correct it himself.

It is a further object of the invention to design the instrument in such a manner that an image of the azimuth circle appears in the field of vision together with the target. In this way, a reliable reading of the azimuth is obtained. It is only necessary for the operator to look into the instrument to read the surveyor's rod and the azimuth circle, whereby minimum human reading errors occur. It may be desirable to picture only a sector of the azimuth circle by means of a lens and a prism on the graduated plate of the instrument, i. e., in the image plane of the telescope.

In the same way, the graduation of the micrometer for the coincidence reading may be pictured in the image plane of the telescope and, thereby, in the field of vision of the operator.

In many cases it is advantageous to connect the adjusting device for displacing the focusing lens adjacent the adjusting device for the tensioning force, for example, by means of a lever. As a result of this, the operator, during the operation of the focusing lens, will adjust automatically the self-leveling feature to the particular target, even in cases when the optical control element is outside of the anallatic point. The instrument then measures accurately automatically at each distance.

Furthermore, an adjusting mechanism for the torsion force can be coupled with the adjusting device for the tensioning force by which, otherwise, the self-leveling condition would be controlled, so that the target direction is maintained which would be changed during variation of the tensioning force.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawing,

Figure 2a illustrates a perspective view of the control mechanism of the self-leveling instrument wherein the optical control element is suspended in accordance with the invention by means of a rotating oscillating mount;

Figure 2b shows in perspective view the rotating swinging suspension with a micrometer screw and a device for the coincidence operation. The optical element in this embodiment is designed as prism;

The same parts in the different figures are denoted by the same reference numerals.

Figure 1:
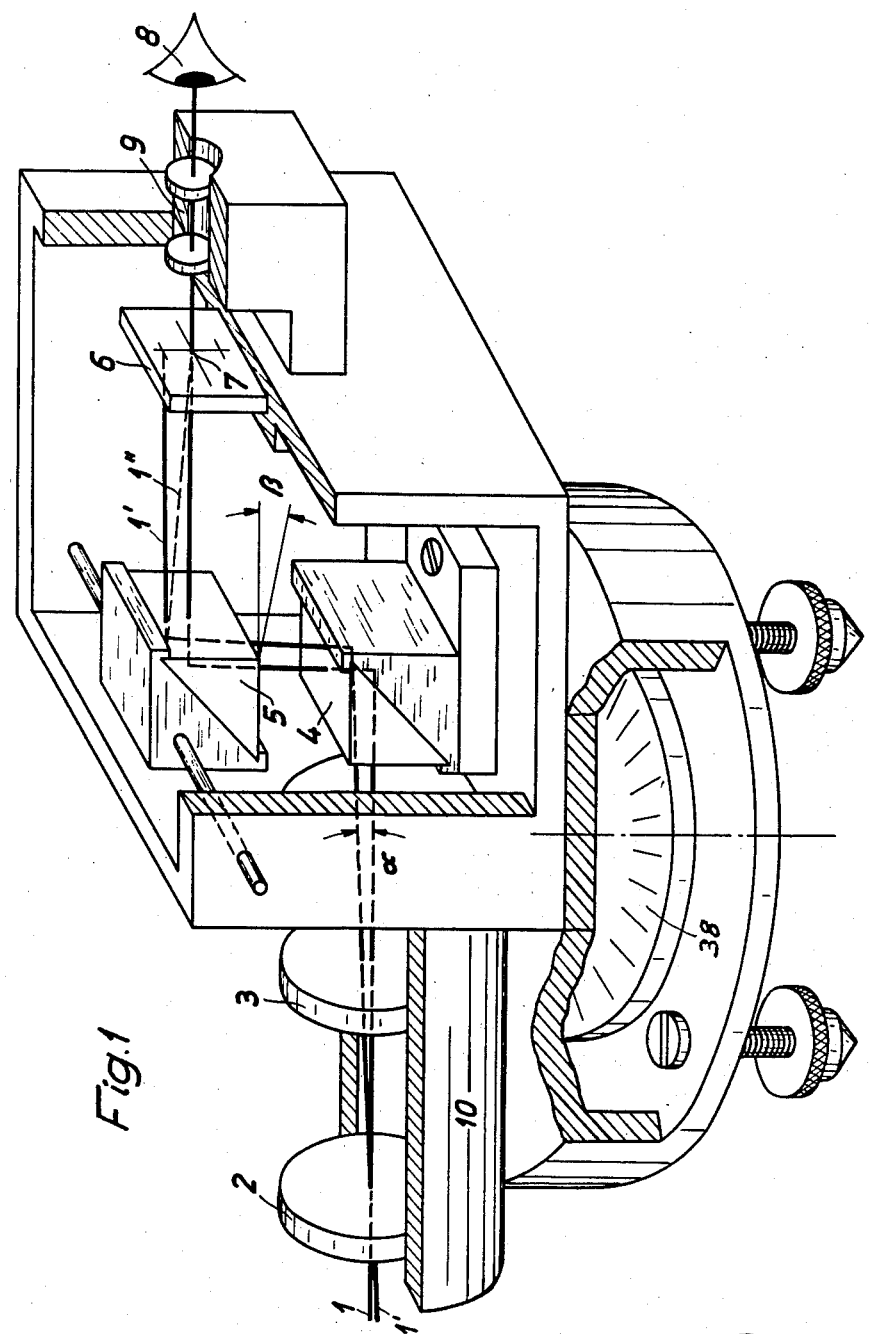
Figure 1 shows an embodiment of the automatic leveling device according to the invention in perspective view with parts of the housing of the instrument broken away to show the interior.

Referring in more detail to the drawings, Figure 1 shows the interior of an automatic leveling instrument. If this instrument is leveled, the horizontal target ray 1 runs parallel with respect to the optical axis, i. e., parallel to the telescope tube 10. The target is viewed through the graduated plate 6 at the cross hairs 7 by means of the objective 2, the focusing lens 3 and the prisms 4 and 5. The operator 8 looks through the eyepiece 9 and sees the target at the cross hairs 7. If the instrument is inclined at an angle $\alpha$, the ray 1' forms an angle $\alpha$ with the tube 10 and the observer 8 notices that the target is outside of the cross hairs 7, i. e., that the instrument is not leveled. If the position of the prism 5 is now adjusted according to the position of the instrument body with respect to the vertical, the image of the target will appear at the cross hairs 7, due to the deviation of the ray at 1'', even in case of inclination of the instrument body. If the instrument is inclined at the angle $\alpha$ with respect to the horizontal, the prism 5 has to be inclined at an angle $\beta$ in order to provide automatic leveling. The ratio $\alpha/\beta$ depends upon the location of the movable member 5 in the instrument and upon the target distance. If $\alpha/\beta$ is constant, the optical control member has to be in the anallatic point.

Figure 3:
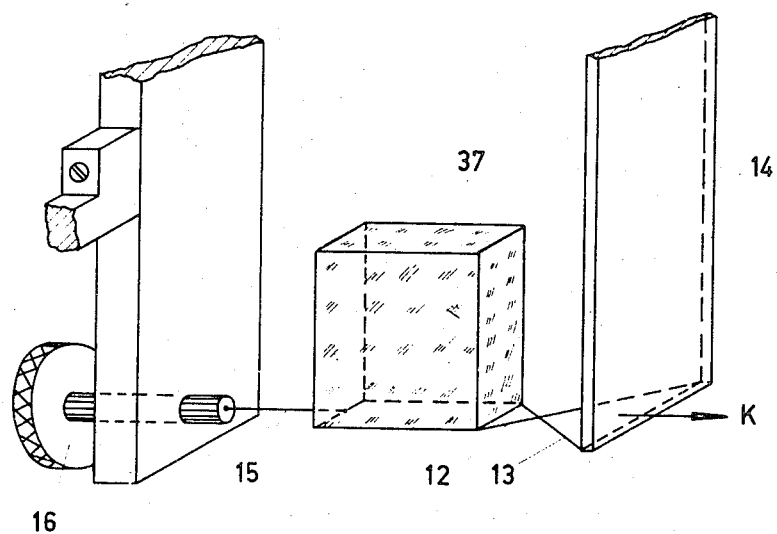
Figure 3 shows a perspective view of a part of a rotating swinging suspension which is modified with respect to that shown in Figure 2b, i. e., the optical control member is designed as a plate with parallel faces.

The optical control member does not have to be a prism as shown in Figures 1 and 2. It may, for instance, as shown in Figure 3, comprise a glass plate 37 with parallel faces. If the inclination of this glass plate 37 with respect to the incident ray is changed, the emergent ray will be subjected to a corresponding parallel displacement.

Figure 2a shows the control mechanism of a self-leveling instrument with a rotating swinging suspension according to the invention. A similar suspension and the optical control member which is in the present case the prism 5 are illustrated in Figure 2b on an enlarged scale for the sake of clarity.

Initially disregarding the springs 30 and 31, the optical control member 11, including the prism 5, is suspended on one side by filaments or bands 12, 13 attached to a leaf spring 14 and is suspended on the other side by a torsion wire or band 15. The filaments 12, 13, as shown in Figure 2a, are disposed in such a manner, that they cross one another without touching, so that they cannot contact each other when the member 11 is turned. The target direction can be readily varied by the observer by adjusting the torsion on the wire 15 by turning the knurled knob 16. Indeed, when the torsion is adjusted, a variation occurs in the amount by which the tensioning device 12 and 13 is twisted from a zero position. As a result of this, the position of the member 11 and the target direction are changed. An adjusting device, 17, 18 is also provided to vary the tension force K for adjusting the self-leveling feature. This is necessary because the turning moment of the member 11 is changed, in case of rotating swinging suspension, when the tensioning force K is varied, so that the ratio $\alpha/\beta$ is changed. Thus, with the instrument according to the invention, the operator can readily adjust and correct the target direction within a wide range by operating the torsion device 15, 16 and can correct the self-leveling feature and adapt it to many measuring problems by operating the adjusting device 17 for the tensioning force K. The control member 11 is shock-mounted by the rotating oscillating suspension 12, 13 and 15 to withstand intense jolts exerted on the instrument, and will provide accurate measurements.

Figure 2b shows additionally a device adapted to change the rest position of the control member 11 whereby the target direction is variable by a measurable amount. This device comprises a bracket 32 mounted on the instrument body and supporting a leaf spring 33 engaging a micrometer drive 34. The leaf spring 33 is connected to the control member 11 via a helical spring 36. By adjusting the micrometer drive 34, the position of the leaf spring 33 and, thereby, that of the member 11 is changed. This change in position of the member 11 and thus of the target direction can be read on the control knob 35 mounted on the drive 34 and provided with a scale. By the provision of this assembly, the plate with parallel faces, inserted in the path of the ray which, heretofore, was generally necessary for coincidence reading, can be omitted.

Obviously, a suitable micrometer device, such as a worm gear drive, can be directly provided on the adjusting device 16 of the torsion wire 15. The adjusting device for the tensioning force K may comprise a screw 18 provided in a manner known per se with two oppositely directed threads 19 and 20 which have different pitches. By turning the knurled knob 17, the displacement of the block 21 supporting the leaf spring 14, and thereby the tension of this spring, can be finely adjusted.

The self-leveling feature can be subsequently automatically adjusted by displacing the focusing lens 3 and, thereby, the anallatic point. The rack 22, by means of which a gear 24 and a rotary knob 23 are turned, and which, in turn, displace a supporting element 25 of the focusing lens is adapted also to adjust the screw 18 via a lever 26 engaging a notched block 27 on the rack 22, whereby the tensioning force can be adjusted as described in the foregoing. In addition to this, the torsion force on the wire 15 will simultaneously be adjusted by means of a gear 28 engaging the rack 22, so that the target direction will remain unchanged.

The gear 28 and a shaft 29 of the torsion device, as well as the lever 26 and the screw 18, are preferably not rigidly connected to one another, i. e., these parts are interconnected by friction, so that a subsequent adjusting by means of the knurled knobs 16 and 17 is possible independent of the simultaneous control.

The tensioning and torsion forces may be automatically re-adjusted by connecting the support 25 of the focusing lens to a spring 30 attached to the leaf spring 14 and to a further spring 31 attached to the controlling member 11. The force K of the leaf spring 14 is compensated more or less during displacements of the focusing lens. The spring constant and the geometric arrangement of the system can be selected or designed in such a manner that the self-leveling feature is retained. In a similar manner, the spring 31 causes a moment of rotation of the body 11 which changes with the displacement of the focusing lens, so that the torsion force in the wire 15 is compensated, more or less. Thus, the spring 30 can replace the lever 26 and the spring 31 can replace the gear train 22, 28.

If the operator focuses the instrument sharply to the target by operating the control knob 23, a certain force K and, thereby, a certain self-leveling effect are simultaneously adjusted. The rotating swinging suspension can be designed in such a manner, that the instrument of Figure 2a is automatically leveled for each target distance, even if the control member lies outside of the anallatic point.

Figure 4:
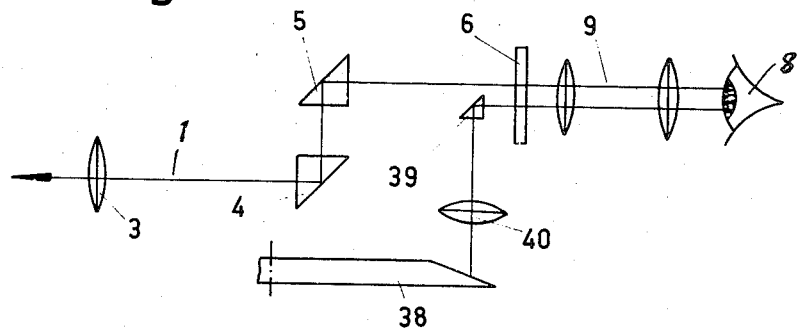
Figure 4 is a schematic illustration of the optical system for adjusting the reading of the azimuth circle in the field of vision of the instrument according to the invention.

Figure 4 is a schematic view of a system causing the appearance of the azimuth circle 38 in the field of vision together with the image of the target. A section of the scale of the azimuth circle 38 is pictured in the plane of the graduated plate 6 by means of a lens 40 and a prism 39.

The control member is advantageously damped so that the instrument can be rapidly adjusted and oscillations during the adjustment are avoided. Air or eddy current damping means or other suitable damping devices which are velocity-dependent can be advantageously used for this purpose.

I claim:

1. A fine leveling device for use in a telescope having an objective lens and having an eye piece lense mounted in a frame in a longitudinal light ray path, said leveling device comprising a light ray deflection member disposed in the optical path and pivotable about a horizontal transverse axis to deflect said rays in a vertical plane; and a deflection member suspension comprising a torsion filament supported at one end in said frame and fixed at its other end to one side of said deflection member, a leaf spring supported on said frame and disposed opposite the other side of said deflection member and spaced therefrom, a pair of tension filaments attached between said other side of said deflection member and said leaf spring and crossed in mutually spaced relation, the tension placed thereon by said leaf spring imparting a turning moment to said deflection member, and said torsion element being twisted to impart to said deflection member an equal and opposite turning moment.

2. In a device as set forth in claim 1, a shaft through said frame aligned with said torsion filament and fixed to the end thereof supported on the frame, said shaft being rotatable in the frame to adjust the twisting of said torsion filament and thus the position of the deflection member about said horizontal axis.

3. In a device as set forth in claim 2, a knob on said shaft and calibrations on said knob furnishing a micrometer adjustment of said deflection element position.

4. In a device as set forth in claim 2, the mounting position of the leaf spring being movable transversely of the frame for adjusting the tension on said tension filaments to adjust the turning moment imparted thereby to the deflection member.

5. In a device as set forth in claim 4, a block mounted on said frame and capable of movement transversely thereof, said leaf spring being mounted on said block, and screw means to adjust the transverse position of the block with respect to the frame.

6. In a device as set forth in claim 4, a focusing lens in said light ray path, a carriage carrying said focusing lens and positionable longitudinally of said telescope to focus the latter; and linkage means connecting said carriage, said shaft, and said screw means, whereby positioning of the carriage to effect focusing of said telescope automatically compensates the adjustment of said deflection member suspension for relative movement between the deflection member and the anallatic locus of the lens system.

7. In a device as set forth in claim 4, a focusing lens in said light ray path, a carriage carrying said focusing lens and positionable longitudinally of said telescope to focus the latter; and coupling means connecting said carriage and said deflection member, whereby positioning of said carriage to effect focusing of the telescope automatically displaces the position of the deflection member about the horizontal axis to compensate the position of the member for relative movement between the deflection member and the anallatic locus of the lens system.

8. In a device as set forth in claim 7, said coupling means comprising at least one helical spring connected between said support and a point on said deflection member offset from said horizontal axis.

9. In a device as set forth in claim 1, an azimuth circle mounted on said frame, and an optical lens system in said telescope and providing an image visible at the eye piece lens of the bearing of the telescope with respect to the azimuth circle.

10. In a device as set forth in claim 1, said deflecting member being a prism in the optical path.

11. In a device as set forth in claim 1, said deflecting member being an optical lens with parallel plane faces.

No references cited.